United States Patent [19]

Yanagihara

[11] Patent Number: 4,534,520
[45] Date of Patent: Aug. 13, 1985

[54] WEBBING TAKE-UP AMOUNT LIMITING DEVICE OF A RETRACTOR

[75] Inventor: Hideo Yanagihara, Fujisawa, Japan

[73] Assignee: NSK-Warner K.K., Tokyo, Japan

[21] Appl. No.: 563,218

[22] Filed: Dec. 19, 1983

[30] Foreign Application Priority Data

Dec. 28, 1982 [JP] Japan .................. 57-195905

[51] Int. Cl.³ ............... A62B 35/00; B65H 75/48
[52] U.S. Cl. ................... 242/107; 242/107.6
[58] Field of Search ............... 242/107–107.7; 280/803, 806, 807, 808; 297/475–478

[56] References Cited

U.S. PATENT DOCUMENTS

| | | | |
|---|---|---|---|
| 3,531,060 | 9/1970 | Foster | 242/107.2 |
| 3,682,412 | 8/1972 | Kuszynski | 242/107.6 X |
| 3,700,184 | 10/1972 | Francis | 242/107.6 X |
| 3,916,974 | 11/1975 | Lidin | 242/107 X |
| 3,929,351 | 12/1975 | Fricko | |
| 4,261,530 | 4/1981 | Asai et al. | 242/107.6 X |
| 4,285,479 | 8/1981 | Blom | 242/107.6 X |

FOREIGN PATENT DOCUMENTS 1000768  8/1965  United Kingdom.

Primary Examiner—John M. Jillions
Attorney, Agent, or Firm—Shapiro and Shapiro

[57] ABSTRACT

In a retractor having a base, a webbing take-up shaft rotatably supported by the base, and a biasing member for biasing the shaft in a webbing take-up direction, a webbing take-up amount limiting device is characterized in that between a portion movable in association with the take-up shaft and a portion integral with the base, a connecting member for connecting the two portions is provided so that in a condition in which a predetermined amount of webbing has been taken up around the take-up shaft, the connecting member assumes its tensioned state between the two portions and prevents the rotation of the take-up shaft in the webbing take-up direction to thereby limit any further take-up of the webbing.

6 Claims, 5 Drawing Figures

WEBBING TAKE-UP AMOUNT LIMITING DEVICE OF A RETRACTOR

BACKGROUND OF THE INVENTION

1. Field of the Invention

This invention relates to a webbing take-up amount limiting device of a retractor, and more particularly to a device for limiting the range of rotation of a webbing take-up shaft to thereby limit the amount of take-up of webbing.

2. Description of the Prior Art

To prevent a seat belt from crossing the get-on-and-off space and hampering the getting on and off of the seat occupant during the non-use of the seat belt and to prevent the seat occupant from being subjected to an unpleasant sense of oppression from the seat belt biased in a take-up direction during the use of the seat belt, there have heretofore been proposed various devices for limiting the amount of take-up of the seat belt onto the retractor. Many of these devices have their own merits and demerits. For example, the device of the type in which a stopper or the like is attached to the webbing and the amount of take-up is limited by the engagement of the stopper with another member is simple in principle and low in cost, but it has a disadvantage that the projection such as the stopper present on the webbing touches the body of the seat occupant and provides a hindrance when he wears the seat belt. The device of the type in which the base supporting the take-up shaft is designed to limit the diameter of the roll of webbing and thereby limit the amount of take-up does not suffer from the disadvantage that the projection touches the human body, but it does not do well in the accuracy of limitation of the amount of take-up. Although, there are systems of the take-up shaft rotation limiting type which are similar to the system of the present invention, in which the retractor body is provided with a limiting mechanism which provides excellent accuracy of limitation of the amount of take-up as well as ease with which the amount of take-up is set, such systems are expensive.

SUMMARY OF THE INVENTION

It is therefore an object of the present invention to provide a webbing take-up amount limiting device of a retractor which is simple in structure and low in cost while making the most of the merits of the take-up shaft rotation limiting system.

The invention will become fully apparent from the following detailed description thereof taken in conjunction with the accompanying drawings.

DESCRIPTION OF THE PREFERRED EMBODIMENT

Figure 1:
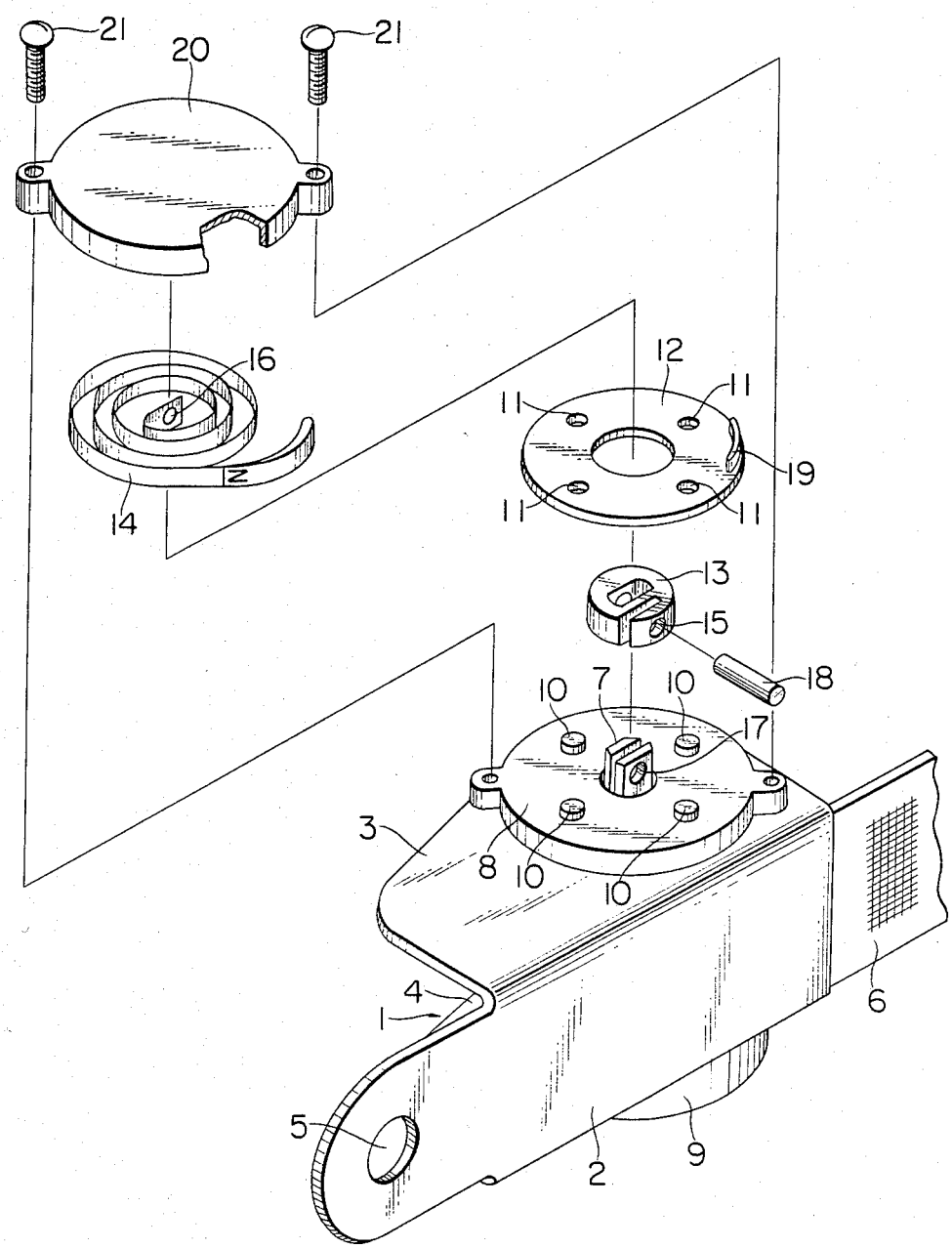
FIG. 1 is an exploded perspective view of an embodiment of the present invention.

An embodiment of the present invention will hereinafter by described by reference to the drawings. Referring to FIG. 1, a retractor base 1 comprises a base portion 2 and a pair of side plate portions 3 and 4 oppositely rising from the opposite edges of the base portion. A circular hole 5 through which a fastening member for attaching the retractor to a suitable portion of a vehicle may be passed is formed in the base portion 2, and a take-up shaft 7 on which a webbing 6 may be taken up is rotatably supported between the side plate portions 3 and 4.

The take-up shaft 7 is biased in a webbing take-up direction (a clockwise direction as viewed in FIG. 1) by a take-up spring in a spring cover 8 secured to the side plate portion 3. Secured to the other side plate portion 4 is a sensor cover 9 which contains therein a mechanism for sensing a speed change of the vehicle exceeding a predetermined value and locking the rotation of the take-up shaft 7 in a webbing draw-out direction, or a mechanism for sensing a draw-out speed or a draw-out speed change of the webbing 6 exceeding a predetermined value and locking the take-up shaft 7, or a mechanism having both of these two functions.

An adjuster 12 is positionally adjustably mounted on the spring cover 8 with circular holes 11 mating with the circular projections 10 of the spring cover. A ribon hook 13 is fitted over the outer end of the take-up shaft 7, and the inner end of a ribbon 14 having suitable flexibility and strength is attached to the take-up shaft 7 side by a pin 18 being inserted into the circular holes 15, 16 and 17 of the ribbon hook 13, the ribbon 14 and the take-up shaft 7, respectively. The outer end of the ribbon 14 is secured to the projection 19 of the adjuster 12. A cover 20, with the spring cover 8, is secured to the side plate portion 3 by means of screws 21 so as to cover the ribbon 14, the ribbon hook 13, etc.

Figure 2:
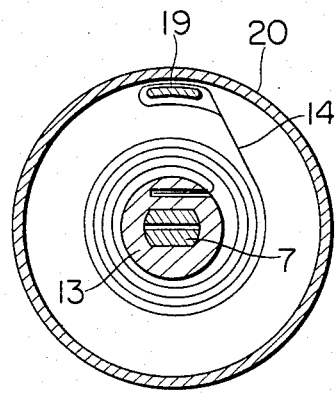
FIGS. 2 to 5 illustrate the operation of the embodiment.

The ribbon 14, as shown in FIG. 2, is mounted so that it is taken up counterclockwise around the ribbon hook 13 in a tensioned state with the webbing 6 being in a condition in which it must not be taken up any further in the take-up direction (the clockwise direction as viewed in FIG. 2).

Operation of the present embodiment will hereinafter be described on the basis of the above-described construction. First, in a condition in which the webbing 6 has been taken up by a maximum amount, the ribbon 14 is as shown in FIG. 2, and if the webbing 6 is set in order to extend so as not to cross the get-on-and-off space, the present embodiment will provide a get-on-and-off countermeasure particularly useful in a two-door vehicle and, if the seat component is wearing the belt, the biasing force of the take-up spring will not be applied to the webbing 6 and thus, the present embodiment will provide means for ensuring comfortable wearing of the belt. However, the present embodiment may be said to be directed to the former purpose because the ribbon 14 is rather long, and if the present embodiment is to be directed to the latter purpose, the ribbon 14 will actually be shorter.

Figure 3:
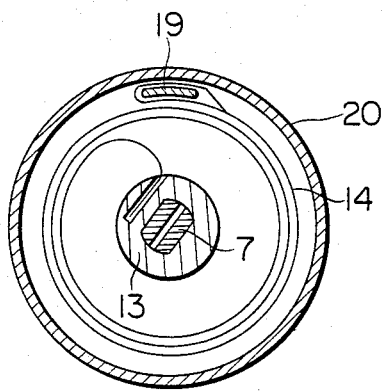
Figure 4:
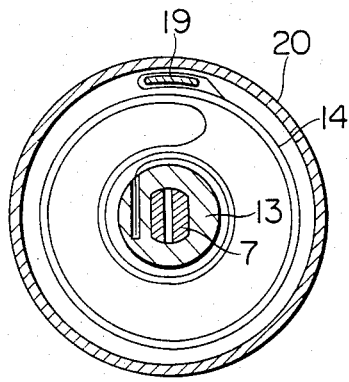
Figure 5:
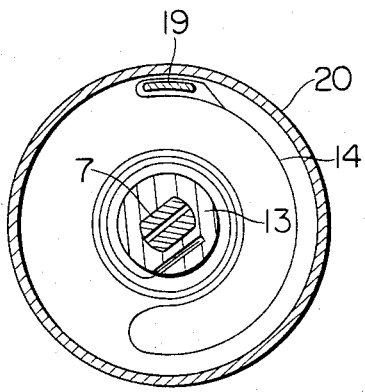

As the webbing 6 is drawn out from the condition of FIG. 2, the take-up shaft 7 rotates counterclockwise and the ribbon 14 begins to unwind. Then the ribbon reaches a condition in which the whole amount of it has been unwound as shown in FIG. 3. When the webbing 6 is further drawn out, the ribbon 14 now begins to be wound around the ribbon hook 13 in the opposite direction as shown in FIG. 4 and, in a condition in which the whole amount of webbing 6 has been drawn out, the ribbon 14 is completely wound around the ribbon hook 13 with some margin left as shown in FIG. 5.

Next, as the webbing 6 is taken up, the ribbon reaches the condition of FIG. 2 through a process opposite to the draw-out process although there is some difference in the condition of the ribbon 14, whereupon the take-up of the webbing 6 is completed.

The above-described embodiment is merely illustrative and the following modification and change can be made therein.

First, the ribbon 14 may assume the condition of FIG. 3 during the maximum draw-out of the webbing, and then the process between the conditions of FIGS. 2 and 3 may follow to thereby limit the take-up amount of the webbing. In such case, a greater length of ribbon will be required than in the above-described embodiment.

Although the above-described embodiment is attached to a retractor provided with an emergency locking mechanism, the retractor to which the embodiment is attached is not restricted thereto but may also be an automatic locking type retractor or the like.

One end of the ribbon 14 is attached to a portion integral with the take-up shaft 7, but this is not restrictive but the intended purpose may be achieved if it is attached only to a portion operatively associated with the take-up shaft 7.

As regards the property of the ribbon which is a connecting member connecting the take-up shaft side to the base side, the ribbon should only have a property which has a certain degree of strength in its tensioned state and which enables setting of the take-up amount, and it does not matter whether the ribbon is retractile.

According to the present invention, as described above, the take-up amount is limited by a structure in which the take-up shaft side is connected to the base side simply by a connecting member, and this provides an inexpensive device as well as to the ability to limit the take-up amount easily and accurately by setting the length or the like of the connecting member.

Further, according to the above-described embodiment, shock during the stoppage at the take-up amount limit position can be alleviated by the tightening effect of the connecting member and any accompanying trouble or sound can be prevented from occurring.

I claim:

1. In a webbing retractor having a webbing take-up shaft rotatably supported on a base and biasing means for biasing said shaft in the webbing take-up direction to take up said webbing around said shaft, a device for limiting the amount of webbing take-up, said device comprising means for preventing webbing take-up rotation of said shaft, said preventing means including an elongated flexible member connected between said base and said shaft and having means for tensioning said member in opposition to the force of said biasing means as said shaft rotates in the webbing take-up direction and thereby to prevent further rotation of the shaft in the webbing take-up direction when a predetermined amount of the webbing has been taken up.

2. A device according to claim 1, wherein said elongated flexible member is a ribbon.

3. A device according to claim 2, wherein said ribbon is spiral shaped.

4. A device according to claim 2, further including a ribbon hook fixed to said shaft and an adjuster adjustable mounted on said base, one end of said flexible member being connected to the ribbon hook and the other end to said adjuster.

5. A device according to claim 3, wherein said adjuster comprises means adapted to be fixed on said base at different positions spaced circumferentially about said shaft.

6. In a webbing retractor having a webbing take-up shaft rotatably supported on a base and biasing means for biasing said shaft in a webbing take-up direction to take up said webbing around said shaft, a device for limiting the amount of webbing take-up, comprising means for preventing webbing take-up rotation of said shaft, said preventing means including an elongated flexible spiral member connected between said shaft and said base and wound about said shaft in a first direction when said webbing has been taken up on said shaft, and means for causing said spiral member to be unwound from said shaft as said webbing is drawn out and thereafter wound about said shaft in a direction opposite to said first direction when said webbing is further drawn out and for causing said spiral member to be unwound from said shaft and then to be re-wound on said shaft in said first direction when said webbing is taken up on said shaft and to be tensioned in opposition to the force of said biasing means to prevent further rotation of said shaft in the webbing take-up direction when a predetermined amount of said webbing has been taken up.

* * * * *